US008079071B2

(12) United States Patent
Jogand-Coulomb et al.

(10) Patent No.: US 8,079,071 B2
(45) Date of Patent: Dec. 13, 2011

(54) METHODS FOR ACCESSING CONTENT BASED ON A SESSION TICKET

(75) Inventors: Fabrice Jogand-Coulomb, San Carlos, CA (US); Haluk Kent Tanik, Mountain View, CA (US); Oktay Rasizade, Castro Valley, CA (US)

(73) Assignee: SanDisk Technologies, Inc., Plano, TX (US)

(*) Notice: Subject to any disclaimer, the term of this patent is extended or adjusted under 35 U.S.C. 154(b) by 857 days.

(21) Appl. No.: 11/600,263

(22) Filed: Nov. 14, 2006

(65) Prior Publication Data

US 2008/0114995 A1    May 15, 2008

(51) Int. Cl.
G06F 21/22 (2006.01)
H04L 9/28 (2006.01)
H04L 9/16 (2006.01)
H04K 1/00 (2006.01)

(52) U.S. Cl. ............... 726/10; 726/6; 726/18; 713/168; 380/44

(58) Field of Classification Search .................. None
See application file for complete search history.

(56) References Cited

U.S. PATENT DOCUMENTS

| | | | |
|---|---|---|---|
| 5,568,437 A | 10/1996 | Jamal | |
| 5,732,209 A | 3/1998 | Vigil et al. | |
| 5,805,609 A | 9/1998 | Mote, Jr. | |
| 5,892,900 A | 4/1999 | Ginter et al. | |
| 5,982,681 A | 11/1999 | Scwarz | |
| 5,982,891 A | 11/1999 | Ginter et al. | |
| 5,995,624 A * | 11/1999 | Fielder et al. | 713/169 |
| 6,040,622 A | 3/2000 | Wallace | |
| 6,085,320 A * | 7/2000 | Kaliski, Jr. | 713/168 |
| 6,154,811 A | 11/2000 | Srbljic et al. | |
| 6,279,114 B1 | 8/2001 | Toombs et al. | |
| 6,298,446 B1 | 10/2001 | Schreiber et al. | |
| 6,401,224 B1 | 6/2002 | Schoniger et al. | |
| 6,732,304 B1 | 5/2004 | Ong | |
| 6,820,148 B1 | 11/2004 | Cedar | |
| 6,901,457 B1 | 5/2005 | Toombs et al. | |
| 6,915,425 B2 | 7/2005 | Xu et al. | |
| 6,956,671 B2 | 10/2005 | Monty et al. | |
| 7,010,808 B1 | 3/2006 | Leung et al. | |
| 7,020,704 B1 | 3/2006 | Lipscomb et al. | |

(Continued)

FOREIGN PATENT DOCUMENTS

CN          1533646          9/2004

(Continued)

OTHER PUBLICATIONS

International Search Report and Written Opinion for PCT/US2007/023648, dated Nov. 21, 2008, 18 pages.

(Continued)

*Primary Examiner* — Christopher Revak (74) *Attorney, Agent, or Firm* — Brinks Hofer Gilson & Lione (57) ABSTRACT

A method for accessing content stored on a memory device is provided. In this method, a request to access the content is transmitted and a session ticket is received. The session ticket includes a parameter used to decrypt the content and the session ticket is generated based on a variable that is configured to change at a session. The content may be accessed based on the session ticket.

16 Claims, 11 Drawing Sheets

U.S. PATENT DOCUMENTS

| | | | |
|---|---|---|---|
| 7,036,020 | B2 | 4/2006 | Thibadeau |
| 7,107,378 | B1 | 9/2006 | Brewer et al. |
| 7,107,620 | B2 | 9/2006 | Haverinen et al. |
| 7,209,995 | B2 | 4/2007 | Pinto et al. |
| 7,215,771 | B1 | 5/2007 | Hamlin |
| 7,284,175 | B2 | 10/2007 | Wang et al. |
| 7,426,747 | B2 | 9/2008 | Thibadeau |
| 7,484,103 | B2 | 1/2009 | Woo et al. |
| 7,493,656 | B2 | 2/2009 | Goodwill et al. |
| 7,549,044 | B2* | 6/2009 | Lee et al. .................. 713/167 |
| 7,555,464 | B2 | 6/2009 | Candelore |
| 2002/0003886 | A1 | 1/2002 | Hillegass et al. |
| 2002/0029350 | A1 | 3/2002 | Cooper et al. |
| 2002/0049679 | A1 | 4/2002 | Russell et al. |
| 2002/0052933 | A1 | 5/2002 | Leonhard et al. |
| 2002/0069420 | A1 | 6/2002 | Russell et al. |
| 2002/0077986 | A1 | 6/2002 | Kobata et al. |
| 2002/0077988 | A1 | 6/2002 | Sasaki et al. |
| 2002/0095588 | A1* | 7/2002 | Shigematsu et al. .......... 713/186 |
| 2002/0126846 | A1* | 9/2002 | Multerer et al. ............. 380/251 |
| 2002/0166047 | A1 | 11/2002 | Kawamoto |
| 2002/0196029 | A1 | 12/2002 | Schmidt |
| 2003/0007646 | A1 | 1/2003 | Hurst et al. |
| 2003/0126086 | A1 | 7/2003 | Sadadi |
| 2004/0019801 | A1 | 1/2004 | Lindholm et al. |
| 2004/0039911 | A1* | 2/2004 | Oka et al. ................... 713/175 |
| 2004/0049724 | A1 | 3/2004 | Bill et al. |
| 2004/0103234 | A1 | 5/2004 | Zer et al. |
| 2004/0130944 | A1 | 7/2004 | Krause et al. |
| 2004/0249768 | A1 | 12/2004 | Kontio et al. |
| 2004/0255138 | A1 | 12/2004 | Nakae et al. |
| 2005/0010531 | A1 | 1/2005 | Kushalnagar et al. |
| 2005/0021539 | A1 | 1/2005 | Short et al. |
| 2005/0022015 | A1 | 1/2005 | Van Den Heuvel et al. |
| 2005/0044046 | A1 | 2/2005 | Ishiguro |
| 2005/0198510 | A1 | 9/2005 | Robert et al. |
| 2005/0210236 | A1* | 9/2005 | Lee et al. ................... 713/153 |
| 2005/0235143 | A1 | 10/2005 | Kelly |
| 2005/0251714 | A1 | 11/2005 | Nishimura |
| 2005/0287987 | A1 | 12/2005 | Yamamoto |
| 2005/0287989 | A1 | 12/2005 | Lee |
| 2006/0059096 | A1 | 3/2006 | Dublish et al. |
| 2006/0063594 | A1* | 3/2006 | Benbrahim .................. 463/42 |
| 2006/0069644 | A1 | 3/2006 | Vataja et al. |
| 2006/0085353 | A1 | 4/2006 | Wang et al. |
| 2006/0085354 | A1 | 4/2006 | Hirai |
| 2006/0095382 | A1 | 5/2006 | Mahlbacher |
| 2006/0118619 | A1 | 6/2006 | Hulst et al. |
| 2006/0143698 | A1* | 6/2006 | Ohara ........................ 726/10 |
| 2006/0149896 | A1 | 7/2006 | Chang et al. |
| 2006/0195403 | A1 | 8/2006 | New et al. |
| 2006/0195864 | A1 | 8/2006 | New et al. |
| 2006/0200864 | A1 | 9/2006 | Nakanishi et al. |
| 2006/0236405 | A1 | 10/2006 | Terauchi et al. |
| 2007/0043667 | A1 | 2/2007 | Qawami et al. |
| 2007/0124603 | A1* | 5/2007 | Yamamichi et al. .......... 713/194 |
| 2007/0226790 | A1 | 9/2007 | Maher et al. |
| 2007/0255659 | A1 | 11/2007 | Yen et al. |
| 2008/0052686 | A1 | 2/2008 | Jogand-Coulomb et al. |
| 2008/0072060 | A1 | 3/2008 | Cannon et al. |
| 2008/0072061 | A1 | 3/2008 | Cannon et al. |
| 2008/0086693 | A1 | 4/2008 | Jogand-Coulomb et al. |
| 2008/0112562 | A1 | 5/2008 | Jogand-Coulomb et al. |
| 2008/0112566 | A1* | 5/2008 | Jogand-Coulomb et al. . 380/278 |
| 2008/0114686 | A1 | 5/2008 | Jogand-Coulomb et al. |
| 2008/0114692 | A1 | 5/2008 | Jogand-Coulomb et al. |
| 2008/0114693 | A1 | 5/2008 | Jogand-Coulomb et al. |
| 2008/0114772 | A1 | 5/2008 | Jogand-Coulomb et al. |
| 2008/0114880 | A1 | 5/2008 | Jogand-Coulomb et al. |
| 2008/0114958 | A1 | 5/2008 | Jogand-Coulomb et al. |
| 2008/0114982 | A1* | 5/2008 | Bleumer et al. ............. 713/171 |
| 2008/0115211 | A1 | 5/2008 | Jogand-Coulomb et al. |
| 2008/0163201 | A1 | 7/2008 | Jogand-Coulomb et al. |
| 2008/0163246 | A1 | 7/2008 | Jogand-Coulomb et al. |
| 2008/0244751 | A1 | 10/2008 | Peinado |
| 2008/0256617 | A1* | 10/2008 | Cartwell ..................... 726/9 |
| 2008/0282083 | A1 | 11/2008 | Risan et al. |
| 2009/0138936 | A1 | 5/2009 | Biderman |
| 2009/0158344 | A1 | 6/2009 | Anglin, Jr. |
| 2010/0077202 | A1 | 3/2010 | Lee et al. |
| 2011/0091036 | A1* | 4/2011 | Norrman et al. ............. 380/44 |

FOREIGN PATENT DOCUMENTS

| | | |
|---|---|---|
| EP | 0 715 243 | 6/1996 |
| EP | 1 278 331 | 1/2003 |
| EP | 1 280 149 | 1/2003 |
| EP | 1 445 888 | 8/2004 |
| EP | 1 480 103 | 11/2004 |
| EP | 1 496 642 | 1/2005 |
| EP | 1 533 676 A1 | 5/2005 |
| EP | 1 564 961 | 8/2005 |
| EP | 1 598 822 | 11/2005 |
| EP | 1 635 265 | 3/2006 |
| JP | 2005085023 | 3/2005 |
| WO | WO 02/15020 | 2/2002 |
| WO | WO 02/19266 | 3/2002 |
| WO | WO 03/098409 | 11/2003 |
| WO | WO 2005/084107 A2 | 9/2005 |
| WO | WO 2006/011768 | 2/2006 |
| WO | WO 2006/069311 | 6/2006 |
| WO | WO 2006/109970 A1 | 10/2006 |

OTHER PUBLICATIONS

Final Office Action for U.S. Appl. No. 11/599,655 dated Mar. 5, 2009, 16 pages.
Invitation to Pay Additional Fees for PCT/US2007/023399, filed on Nov. 9, 2007, 8 pages.
Office Action for U.S. Appl. No. 11/599,655 entitled, "Methods for Linking Content With License", filed Nov. 14, 2006, 15 pages.
Office Action for U.S. Appl. No. 11/600,270 entitled, "Apparatus for Linking Content with License", filed Nov. 14, 2006, 13 pages.
International Search Report and Written Opinion for PCT/US2007/023615, dated Jun. 2, 2008, 12 pages.
International Search Report and Written Opinion for PCT/US2007/023617, dated Jun. 11, 2008, 12 pages.
International Search Report and Written Opinion for PCT/US2007/023618, dated May 30, 2008, 10 pages.
International Search Report and Written Opinion for PCT/US2007/023649, dated May 29, 2005, 14 pages.
ISO/IEC 7816 Standard: "Identification Cards Integrated Circuit(s) Cards with Contacts", Part 1: Physical Characteristics, 8 pages.
Knipper, Gary, "System ACE Configuration Solutions for Xilinx FPGA's", White Paper, May 18, 2006, 9 pages, WP151.
Kravitz, D.W. et al., "Achieving Media Portability Through Local Content Translation and End-to-End Rights Management", Proceedings of the 5th ACM Workshop on Digital Rights Management, pp. 27-36, Nov. 7, 2005.
Mercurio, Chris, "How to Disable the Auto-Launch "feature" for SD Cards", http://mytreao.net/archives.2006/08/hot-to-disable-the-autolaunch-feature-for-sd-cards.html. (visited on Dec. 15, 2006).
"Microsoft to Embed Viral Growth into Zune MP3," http://www.adrants.com/2006/10/microsoft-to-enbed-viral-growth-into-zune.php, Oct. 25, 2006, 5 pages.
Office Action for U.S. Appl. No. 10/888,294, entitled, Non-Volatile Memory System with Self Test Capability, filed Jul. 9, 2004, 13 pages.
*SAMPLE: MIMEfilt Demonstrates MIME Filter for Internet Explorer*, http://www.support.microsoft.com/default.aspx?scid=kb;EN-US;q260840 (visited on Aug. 29, 2006).
"Steve Jobs not bothered about Zune," http://www.earthtimes.org/articles/printstory.php?news=9817, Oct. 25, 2006, 1 page.
"The Multimedia Card System Specification", Version 2.11, Jun. 1999, Multimedia Card Association, Cupertino, CA, 53 pages.
"The Multimedia Card System Specification", Version 2.2, Jan. 2000, Multimedia Card Association, Cupertino, CA, 123 pages.
The Multimedia Card Product Manual, Revision 2, Apr. 2000, SanDisk Corporation, 86 pages.
Transmittal of the International Search Report and the Written Opinion of the International Search Authority, or the Declaration, Int'l Appl. No. PCT/US2000/024201, Int'l filing date Jul. 7, 2005, mailed Dec. 21, 2005, 9 pages.

Verisign, *Unified Authentication Tokens*; http://www.verisign.com/products-services/security-services/unified-authentication/ (visited on Aug. 29, 2006).
Wilson, James Y., et al., "Inside Bluetooth-Part 1, "*Dr. Dobb's Journal*, Mar. 2000, http://www.ddj.com, 5 pages.
Wilson, James Y., et al., "Inside Bluetooth-Part 2, "Dr. Dobb's Journal, Apr. 2000, http://www.ddj.com, 4 pages.
Office Action for U.S. Appl. No. 11/600,005, dated Jun. 30, 2009, 13 pages.
Office Action for U.S. Appl. No. 11/600,300, dated Jul. 14, 2009, 17 pages.
International Search Report and Written Opinion for PCT/US2007/023399, dated Jun. 10, 2008, 17 pages.
Invitation to Pay Additional Fees for PCT/US2007/023648, dated Aug. 5, 2008.
Office Action for U.S. Appl. No. 11/600,006, dated Oct. 24, 2008, 21 pages.
Office Action for U.S. Appl. No. 11/600,273, dated Dec. 8, 2009, 11 pages.
Office Action for U.S. Appl. No. 11/600,005, dated Feb. 23, 2010, 11 pages.
Office Action for U.S. Appl. No. 11/600,245, dated Jan. 19, 2010, 11 pages.
Office Action for U.S. Appl. No. 11/600,262, dated Jan. 27, 2010, 15 pages.
Office Action for U.S. Appl. No. 11/600,300, dated Mar. 8, 2010, 16 pages.
Office Action for U.S. Appl. No. 11/509,978, dated Oct. 27, 2009, 19 pages.
Office Action for U.S. Appl. No. 11/599,655, dated Oct. 28, 2009, 14 pages.
Office Action for U.S. Appl. No. 11/599,994, dated Mar. 23, 2010, 19 pages.
Office Action for U.S. Appl. No. 11/599,995, dated Mar. 22, 2010, 30 pages.
Office Action for U.S. Appl. No. 11/599,655, dated Jun. 21, 2010 14 pages.
Office Action for U.S. Appl. No. 11/600,245, dated Jul. 15, 2010, 12 pages.
Office Action for Chinese Patent Application Serial No. 200780048917.7, dated Sep. 13, 2010, 11 pages.
Office Action for U.S. Appl. No. 11/599,994, dated Nov. 22, 2010, 18 pages.
Office Action for U.S. Appl. No. 11/600,300, dated Mar. 16, 2011, 15 pages.
Office Action for U.S. Appl. No. 11/600,005, dated Apr. 4, 2011, 12 pages.
Office Action for Chinese Patent Application Serial 200780046575.5, dated Feb. 17, 2011, 19 pages.
U.S. Appl. No. 11/600,245, dated Jan. 12, 2011, 14 pages.

\* cited by examiner

METHODS FOR ACCESSING CONTENT BASED ON A SESSION TICKET

CROSS-REFERENCES TO RELATED APPLICATIONS

This application is related to U.S. patent application Ser. No. 11/600,273, filed on Nov. 14, 2006, and entitled "Apparatuses for Accessing Content Based on a Session Ticket," the disclosure of which is incorporated herein by reference.

FIELD OF THE INVENTION

Embodiments of the present invention relate generally to content access and, more particularly, linking content with license and accessing the content based on a session ticket.

BACKGROUND

Digital rights management (DRM) is a technology used to protect and control the distribution of content, such as music files, video files, and other content. In DRM, content is encrypted with a cryptographic key, whereby the cryptographic key can also be used to decrypt the content. In order for a user to decrypt and access the content, the user must have access to a license that is associated with the content. Generally, a license can grant different access rights to the content depending on the permissions defined by a license provider. For example, the license may limit the content (e.g., a music file) to be played for a limited number of times.

In traditional DRM technologies, the cryptographic key used to decrypt the content is stored only in the license. The license can be hacked and the cryptographic key can be easily extracted from the license. If the cryptographic key is compromised, an unauthorized user can decrypt the content without the license and thereby access the content without limitations. As a result, there is a need to further improve the protection of content.

SUMMARY

Various embodiments of the present invention provide methods, systems and/or apparatuses for linking a license with content and accessing content based on a session ticket. It should be appreciated that the embodiments can be implemented in numerous ways, including as a method, a circuit, a system, or a device. Several embodiments of the present invention are described below.

In an embodiment, a method for accessing content stored on a memory device is provided. In this method, a request to access the content is transmitted and a session ticket is received. The session ticket includes a parameter used to decrypt the content and the session ticket is generated based on a variable that is configured to change at a session. The content may be accessed based on the session ticket.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide the linking of a license with content and the access of the content based on a session ticket. A cryptographic key is used to decrypt and access an encrypted content. As will be explained in more detail below, parameters associated with both the license and the content are used to derive the cryptographic key. In some embodiments, a parameter used to derive the cryptographic key can be further encrypted with a variable such that access to the content is limited to a session.

Figure 1:
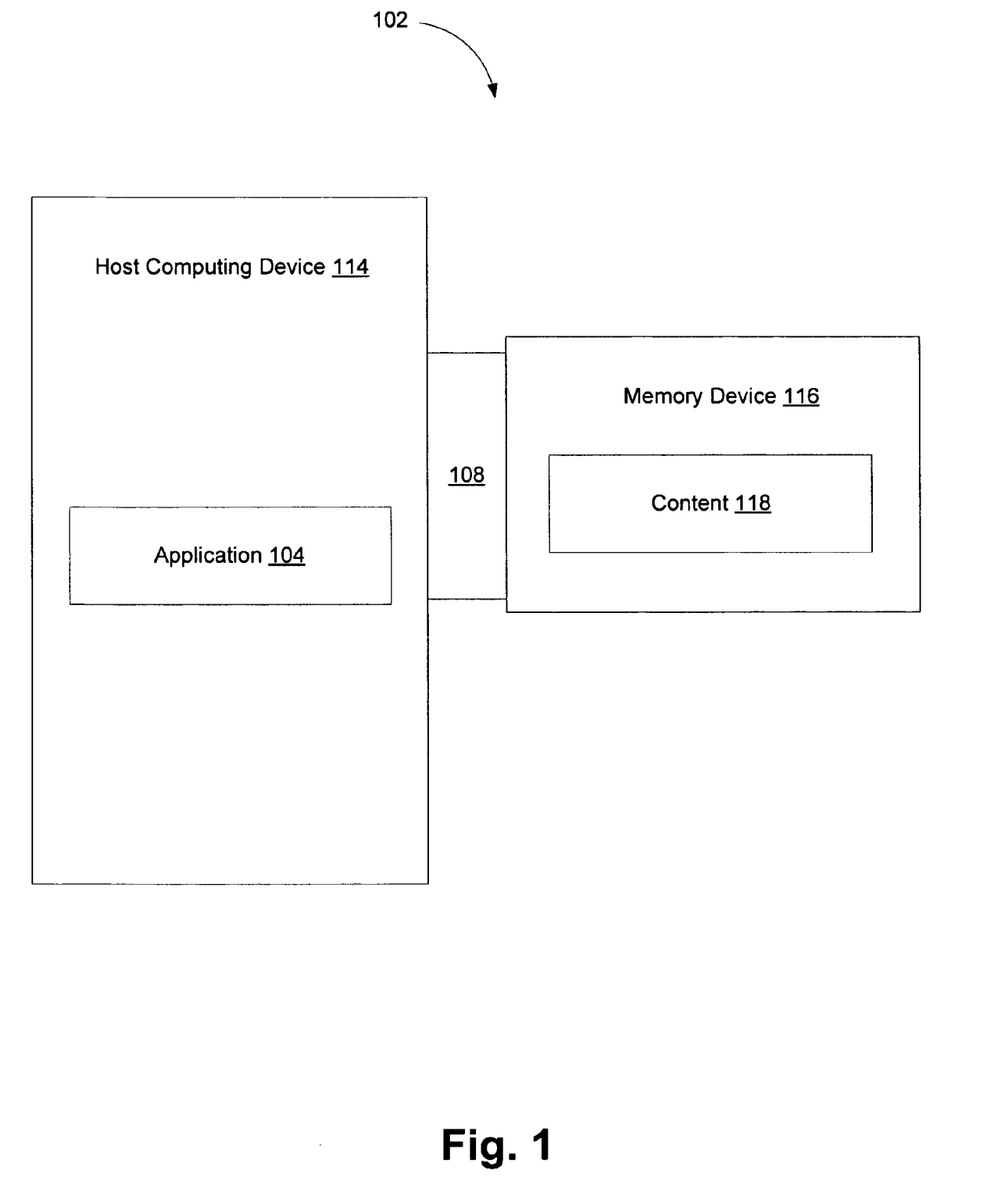
FIG. 1 is a simplified block diagram of a system of apparatuses, in accordance with an embodiment of the invention.

FIG. 1 is a simplified block diagram of a system of apparatuses, in accordance with an embodiment of the invention. As shown in FIG. 1, system 102 includes host computing device 114 and memory device 116. Host computing device 114 can include a variety of electronic devices capable of accessing memory device 116 to store or retrieve content 118 stored on the memory device. Memory device 116 may be removably coupled to host computing device 114 by way of mechanical interface 108 such as pin and/or socket connectors. Memory device 116 is a memory storage device.

As will be explained below, an example of memory device 116 is a memory card using non-volatile memory.

Host computing device 114 hosts application 104. Application 104 may include a variety of program applications. For example, application 104 may be an operating system that manages the hardware and software resources on host computing device 114. In another example, application 104 may be a multimedia player configured to play audio and video files. Additionally, for example, application 104 may be a video game. Application 104 may access content 118 stored in memory device 116. Content 118 can include a variety of data. Examples of content 118 include audio files encoded in audio file formats such as WAVE, MPEG-1 Audio Layer 3 (MP3), Advanced Audio Coding (AAC), and other audio file formats. Content 118 may also include video files encoded in video file formats such as Audio Video Interleave (AVI), Moving Picture Experts Group (MPEG), and other video file formats. Other examples of content 118 include document files, image files, application files, and other data.

Linking License with Content

Figure 2:
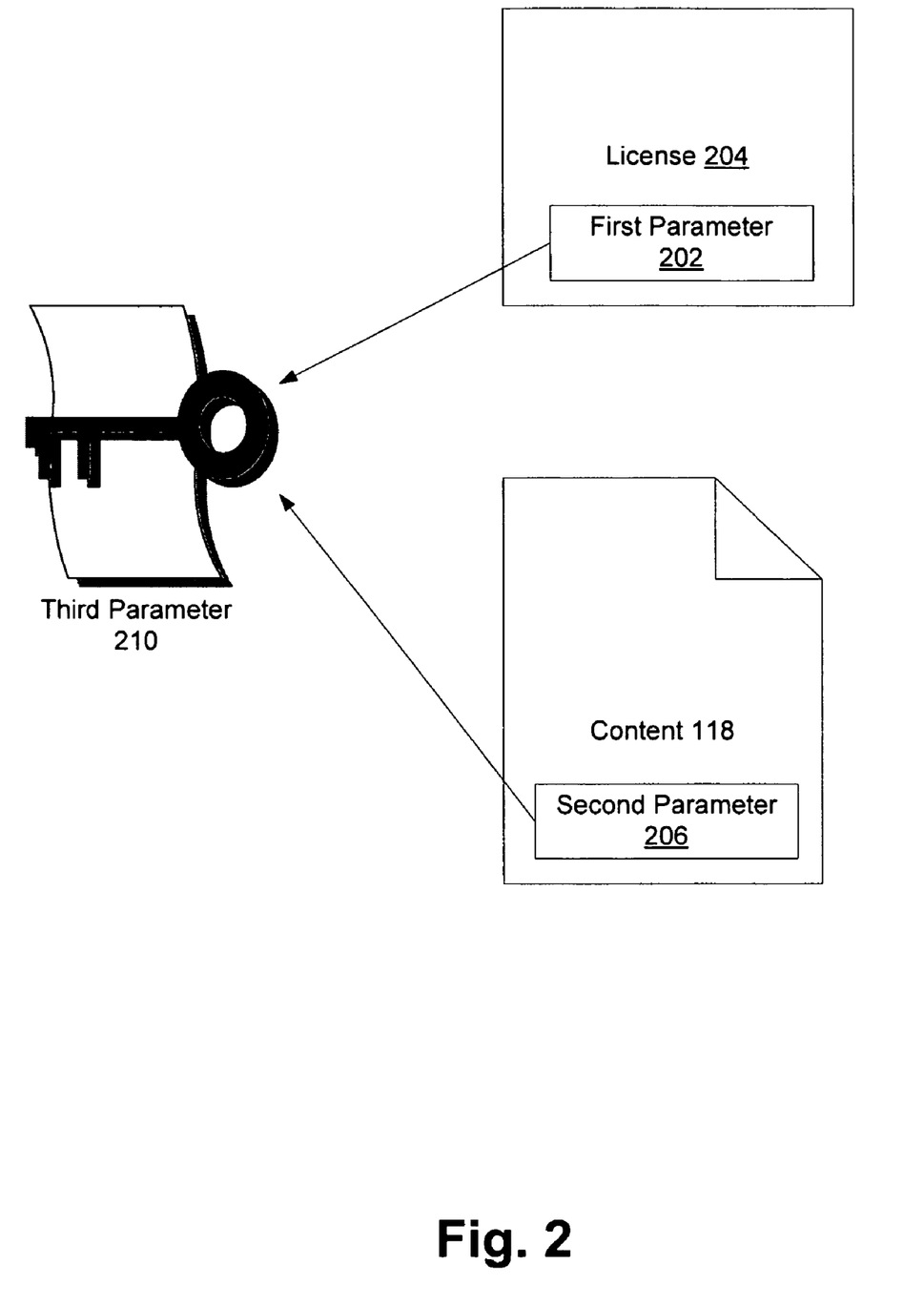
FIG. 2 is a block diagram depicting the generation of a parameter used to decrypt content, in accordance with an embodiment of the invention.

FIG. 2 is a block diagram depicting the generation of a parameter used to decrypt content, in accordance with an embodiment of the invention. FIG. 2 shows 20 content 118 and associated license 204. Content 118 is encrypted such that the content is unintelligible. In general, license 204 is data (e.g., a string, a file, and other data) that enables content 118 to be accessed. License 204 may include the permissions or rules to access content 118, such as duration of access, limiting the access of the content to a particular computing device, dates, times, a number of times the content may be accessed, and other permissions. License 204 therefore may be configured to define the permissions to access content 118. A user therefore is allowed access to content 118 based on the permissions included in license 204. For example, license 204 may allow content 118 in the form of a music file to be played three times on a specific computing device. In another example, license 204 may allow content 118 to be accessed but not copied to another computing device.

Content 118 is encrypted and third parameter 210 is configured for use in decrypting the content. Third parameter 210 includes a variety of data that may be associated with the decryption of content 118. For example, third parameter 210 may be a cryptographic key used for the encryption and decryption of content 118. Instead of the cryptographic key, third parameter 210 may also include a reference to the cryptographic key. The reference, for instance, may be a number or string that identifies the cryptographic key. Third parameter 210 may also include an authentication key. The authentication key is a cryptographic key used for authentication sessions between the host computing device and memory device. In another example, third parameter 210 may be a cryptographic nonce. A cryptographic nonce is a number that can be used to generate the cryptographic key.

Third parameter 210 is generated based on first parameter 202 and second parameter 206. In other words, third parameter 210 can be expressed as $$\text{Third parameter}=F(\text{first parameter, second parameter}) \qquad (1.0)$$

where the third parameter is a function of first and second parameters 202 and 206. The function may include a variety of functions, such as a hash function, whereby third parameter 210 can be the hash value of the hash function. First parameter 202 is associated with license 204 and second parameter 206 is associated with content 118. First and second parameters 202 and 206 may include a variety of data. For example, first parameter 202 may be a number. In an embodiment, the number may be randomly generated. In another embodiment, the number is pre-defined. Second parameter 206 may be dependent on first parameter 202 or vice versa. For instance, second parameter 206 may be a number or string derived from both a reference to a cryptographic key and first parameter 202. Such number or string may be expressed as $$\text{Second parameter}=F(\text{key reference, first parameter}) \qquad (1.2)$$

where second parameter 206 is a function of both the reference to the cryptographic key and first parameter 202. It should be appreciated that second parameter 206 also may be derived from both an authentication key and first parameter 202. In another example, second parameter 206 may be derived from a cryptographic nonce and first parameter 202. Conversely, first parameter 202 may be derived from second parameter 206 and an authentication key, a reference to a cryptographic key, a cryptographic nonce or other parameters.

First and second parameters 202 and 206 are associated with license 204 and content 118, respectively. To be associated with either license 204 or content 118, first and second parameters 202 and 206 may be located or included in the license and the content, respectively. For example, second parameter 206 may be located in the header or footer of content 118. Alternatively, first parameter 202 and/or second parameter 206 may be located separately from license 204 and/or content 118. If located separately, license 204 may be associated with first parameter 202 with the inclusion of a pointer to the first parameter. Content 118 may also include a pointer to second parameter 206 if the second parameter is located separately from the content.

Figure 3:
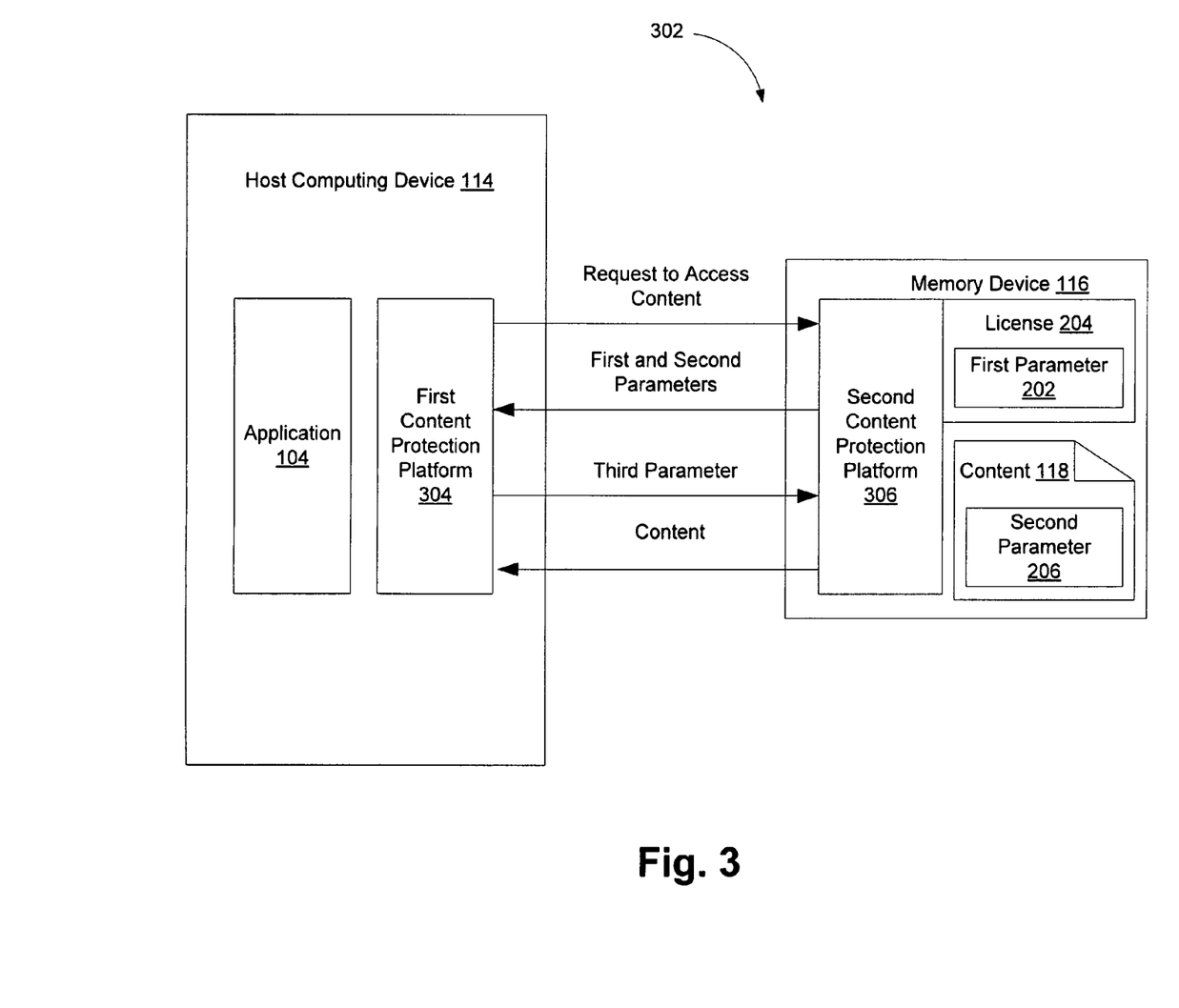
FIG. 3 is a simplified block diagram of a system for accessing a memory device, in accordance with an embodiment of the invention.

FIG. 3 is a simplified block diagram of a system for accessing a memory device, in accordance with an embodiment of the invention. As shown, system 302 includes host computing device 114 coupled to memory device 116. Host computing device 114 may include application 104 and first content protection platform 304. Memory device 116 includes second content protection platform 306, content 118, and license 204. In an embodiment, license 204 may be stored in a hidden partition of memory device 116 where the license is not visible or accessible by many applications. In addition to being stored in memory device 116, license 204 may also be stored in host computing device 114. First and second content protection platforms 304 and 306 are technology platforms for securing content 118 to memory device 116. With first content protection platform 304 and/or second content protection platform 306, a user may transfer memory device 116 and its content 118 without compromising the content protection. There are a variety of content protection platforms that may be used for securing data, examples being sold under the trademarks TrustedFlash™ and Gruvi™ (as manufactured by SanDisk, Inc.).

As shown in FIG. 3, application 104 by way of first content protection platform 304 transmits a request for content 118 stored in memory device 116. Here, content 118 is encrypted. To decrypt content 118, first parameter 202 associated with license 204 and second parameter 206 associated with content 118 are retrieved. First parameter 202 and second parameter 206 may be included in license 204 and content 118, respectively, or may be files located separately from the license and the content. As defined by Equation 1.0, a third parameter is generated based on first parameter 202 and second parameter 206. In other words, the third parameter may be derived from first and second parameters 202 and 206. The third parameter may be a cryptographic key used to decrypt content 118, a reference to the cryptographic key, an authentication key, a nonce, or other parameters. With the third parameter, application 104 can decrypt and access content 118. To access content 118, first content protection platform 304 may transmit the third parameter and request for content 118 to memory device 116. Second content protection platform 306 can decrypt content 118 based on the third parameter and may transmit the content, which is decrypted, to application 104 by way of first content protection platform 304.

In the embodiment of FIG. 3, first content protection platform 304 hosted on host computing device 114 retrieves first and second parameters 202 and 206 and generates the third parameter based on the first and second parameters. In another embodiment, second content protection platform 306 included in memory device 116 can also retrieve first and second parameters 202 and 206 and generate the third parameter based on the first and second parameters.

Figure 4:
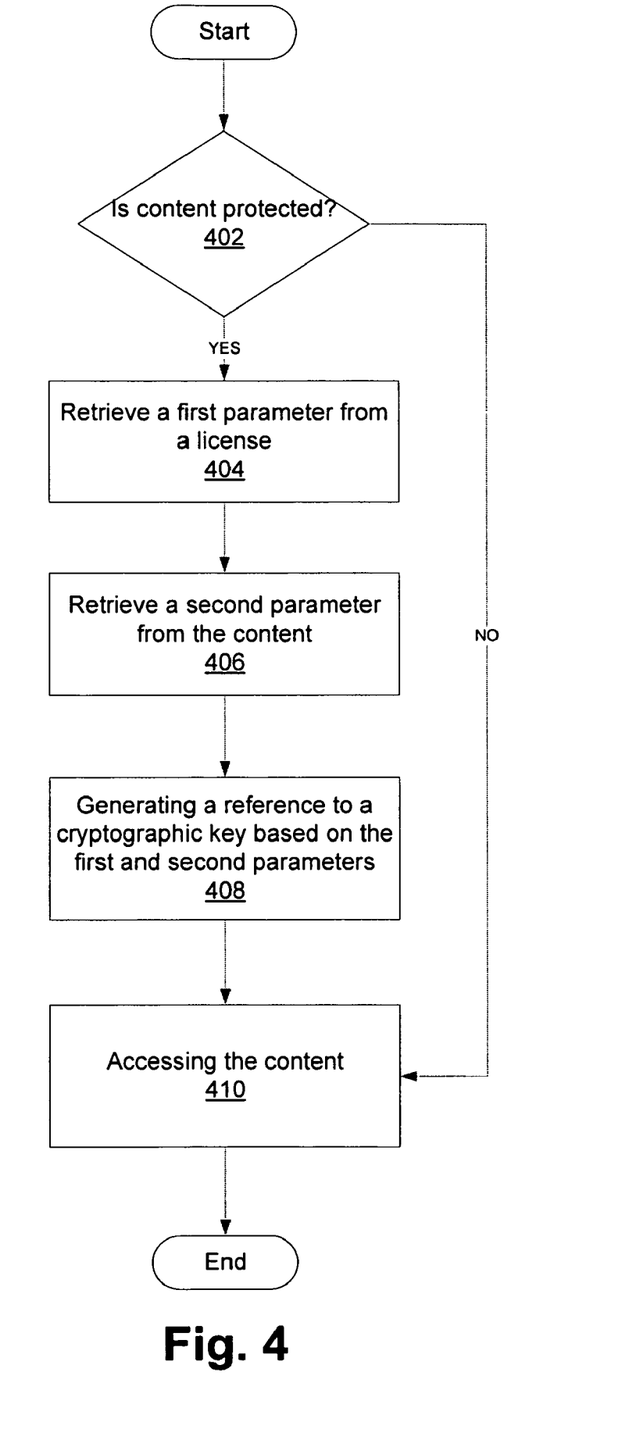
FIG. 4 is a flowchart diagram depicting the access of content from a memory device, in accordance with an embodiment of the invention.

FIG. 4 is a flowchart diagram depicting the access of content from a memory device, in accordance with an embodiment of the invention. Starting at 402, the content is analyzed to determine whether the content is protected (i.e., encrypted). Various information associated with the content can indicate whether the content is encrypted. The header of the content, for example, may indicate that the content is encrypted. Alternatively, the filename extension of the content can also indicate that the content is encrypted. If the content is not protected, then the content may be directly accessed in 410. If content is protected, then a first parameter is retrieved from the license at 404. In this embodiment, the first parameter is a number. The number can be randomly generated or predefined. At 406, a second parameter is retrieved from the content. In an embodiment, as expressed in Equation 1.2, the second parameter may be derived from a reference to the cryptographic key and the first parameter. The cryptographic key is used to encrypt or decrypt the content. As a result, the second parameter is associated with both the content and the license because the second parameter is derived or computed from a reference to the cryptographic key that is used to decrypt the content and a number that is included with the license. Note that in another embodiment, the first parameter (e.g., a number) may be associated with the content and the second parameter may be associated with the license.

With the first parameter and the second parameter, a reference to the cryptographic key may be generated or computed at 408. As expressed above in Equation 1.0, the reference to the cryptographic key can be generated based on the first parameter and the second parameter. Thereafter, at 410, the content can be decrypted and accessed based on the third parameter. For example, in an embodiment, the third parameter in the form of a reference to the cryptographic key can be transmitted to the memory device. The memory device can include a secure store that stores the cryptographic key. The memory device can retrieve the cryptographic key from the secure store using the reference to the cryptographic key. With the cryptographic key, the memory device can decrypt the content and transmit the decrypted content to a host computing device.

Accessing Content Based on a Session Ticket

Figure 5:
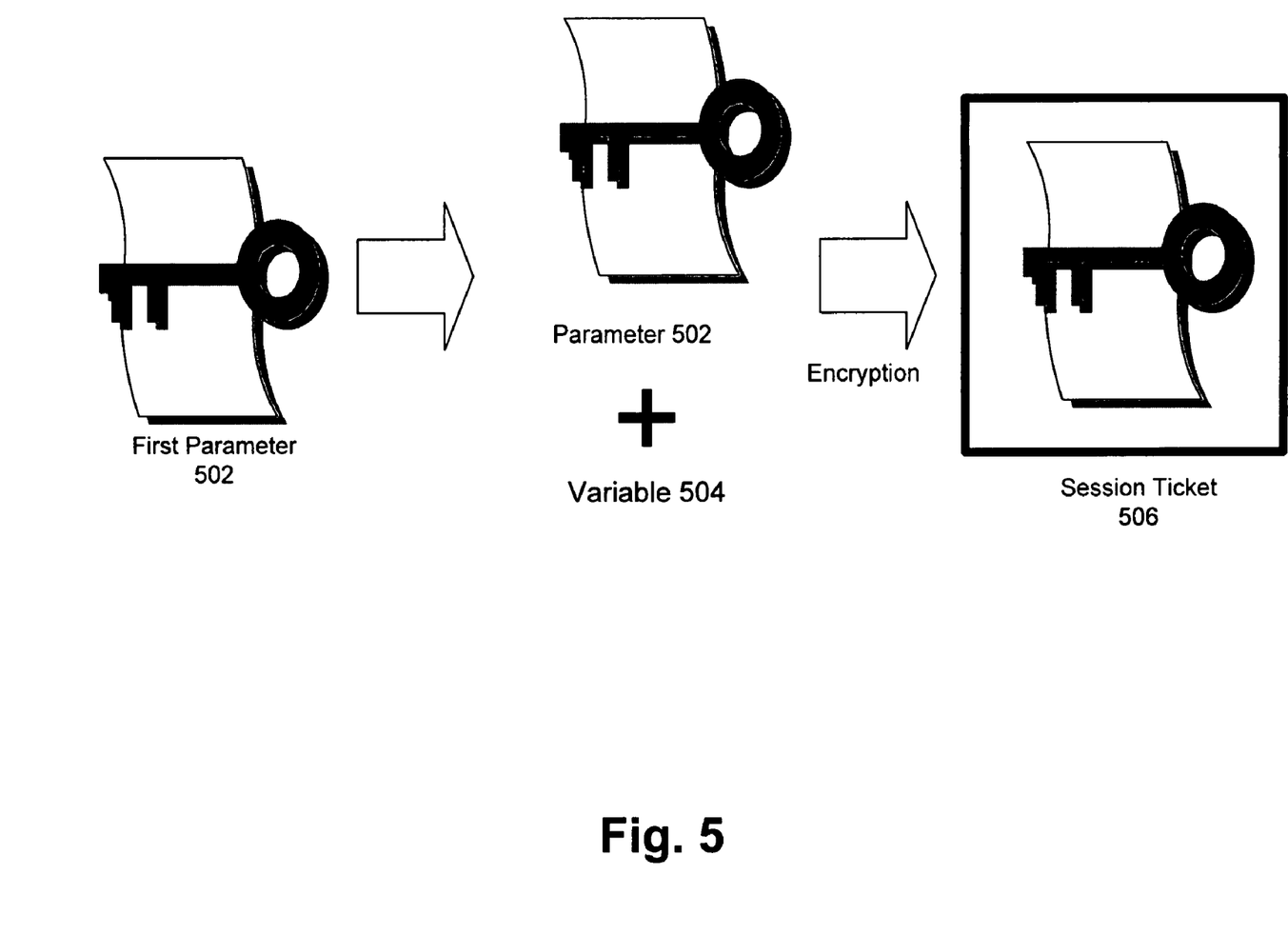
FIG. 5 is a block diagram depicting the generation of a session ticket, in accordance with an embodiment of the invention.

FIG. 5 is a block diagram depicting the generation of a session ticket, in accordance with an embodiment of the invention. Parameter 502 is initially provided and the parameter includes a variety of data that may be associated with the decryption of content. Parameter 502 may be generated based on parameters associated with the license and content as discussed above. Examples of parameter 502 include a reference to a cryptographic key used for the decryption of the content, a cryptographic nonce or other parameters.

The generation of session ticket 506 involves the use of variable 504. Variable 504 includes a variety of data. For example, the data can be a number. The number may be predefined or randomly generated. In another embodiment, the data can be a character string. Unlike the parameters discussed above, variable 504 may not be associated with the license and content. In other words, variable 504 may be independent of the license and content. Variable 504 is configured to change at a session. A session may span for a period of time. For example, the session may last for an hour, a day, a week, or other units of time. In addition, a session may expire when the host computing device that is coupled to the memory device is initiated or restarted. A session may also expire when the memory device is decoupled from the host computing device. Furthermore, for example, a session can span for a limited number of access to the content (e.g., a limited number of times the content can be accessed).

Session ticket 506 is generated based on parameter 502 and variable 504, whereby the parameter is encrypted based on the variable to define session ticket 506. Session ticket 506 can therefore be expressed as $$\text{Session Ticket} = F(\text{Parameter}, \text{Variable}) \tag{2.0}$$

where the session ticket is a function of parameter 502 and variable 504. With session ticket 506, the content may be accessed based on the session ticket. For example, a host computing device can transmit session ticket 506 to the memory device. The memory device may derive the parameter used to decrypt the content based on session ticket 506. Parameter 502 may be derived from $$\text{Parameter} = F^{-1}(\text{Session Ticket}, \text{Variable}) \tag{2.2}$$

where the parameter is an inverse function of session ticket 506 and variable 504.

It should be appreciated that session ticket 506 is associated with a particular content because the session ticket is used to decrypt the content. As a result, another content that is stored in the memory device cannot be used or accessed with session ticket 506 unless the session ticket includes a parameter, such as parameter 502, to decrypt that other content. As an example, if two, separate contents stored in a memory device are encrypted with different cryptographic keys, then the host computing device or memory device generates two, different session tickets to access the two, separate contents. Here, one session ticket cannot be used to access the two, separate contents that are encrypted with different cryptographic keys.

Figure 6:
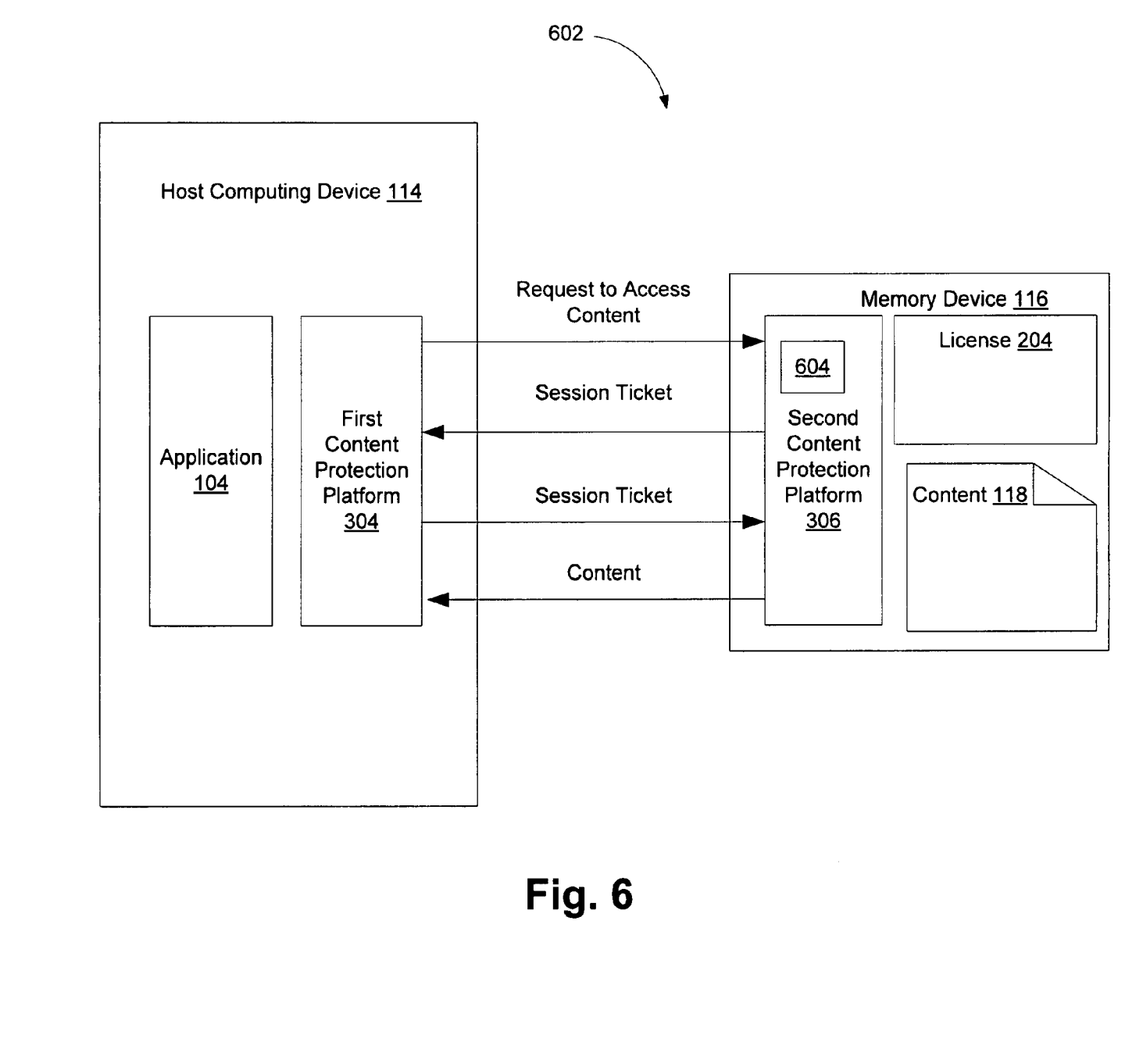
FIG. 6 is a simplified block diagram of a system for accessing a memory device using a session ticket, in accordance with an embodiment of the invention.

FIG. 6 is a simplified block diagram of a system for accessing a memory device using a session ticket, in accordance with an embodiment of the invention. System 602 includes host computing device 114 coupled to memory device 116. Host computing device 114 may include application 104 and first content protection platform 304. Memory device 116 includes second content protection platform 306, content 118, and license 204. As discussed above, first and second content protection platforms 304 and 306 may be configured to manage the digital rights of content 118 stored in memory device 116.

As shown in FIG. 6, application 104 transmits a request for content 118 stored in memory device 116 by way of first content protection platform 304. Content 118 is encrypted with a cryptographic key. A parameter associated with the cryptographic key (e.g., a reference to the cryptographic key, a nonce, or other parameters) is provided to second content protection platform 306. In response to the request to access content 118, second content protection platform 306 encrypts the parameter based on variable 604 to define a session ticket, which is expressed in Equation 2.0. Second content protection platform 306 may generate variable 604 (e.g., a number, a string, or other parameters). Variable 604 is configured to change at a session. For example, second content protection platform 306 may generate a different variable 604 for every session. Variable 604 may be randomly generated or predefined.

After the session ticket is generated, second content protection platform 306 transmits the session ticket to host computing device 114. With the session ticket, host computing device 114 may access content 118 based on the session ticket. To access content 118, host computing device 114 subsequently transmits the session ticket back to memory device 116. With the receipt of session ticket, second content protection platform 306 decrypts the session ticket to extract the parameter used to decrypt content 118, which is expressed in Equation 2.2. If variable 604 has not changed, then the parameter can be extracted because the decryption is based on a variable that is identical to the variable used to encrypt the parameter. Variable 604 may change at different sessions. As a result, variable 604 is identical to the variable used to encrypt the parameter if the variables are generated within the same session. However, if variable 604 has changed, then the parameter cannot be extracted because the decryption is based on a variable that is different from the variable used to encrypt the parameter. Variable 604 is different from the variable used to encrypt the parameter if the variables are generated within different sessions. By changing variable 604 at a session, the session ticket lasts or is valid for one session. If the parameter can be extracted, then the second content protection platform 306 can decrypt content 118 based on the parameter and transmit the decrypted content to host computing device 114.

In another embodiment, first content protection platform 304 may also generate the session ticket by encrypting the parameter used to decrypt content 118. Here, in response to request by application 104 to access content 118, first content protection platform 304 may generate the session ticket and transmit the session ticket to application 104. Application 104 can then transmit the session ticket back to first content protection platform 304 to access content 118.

Figure 7:
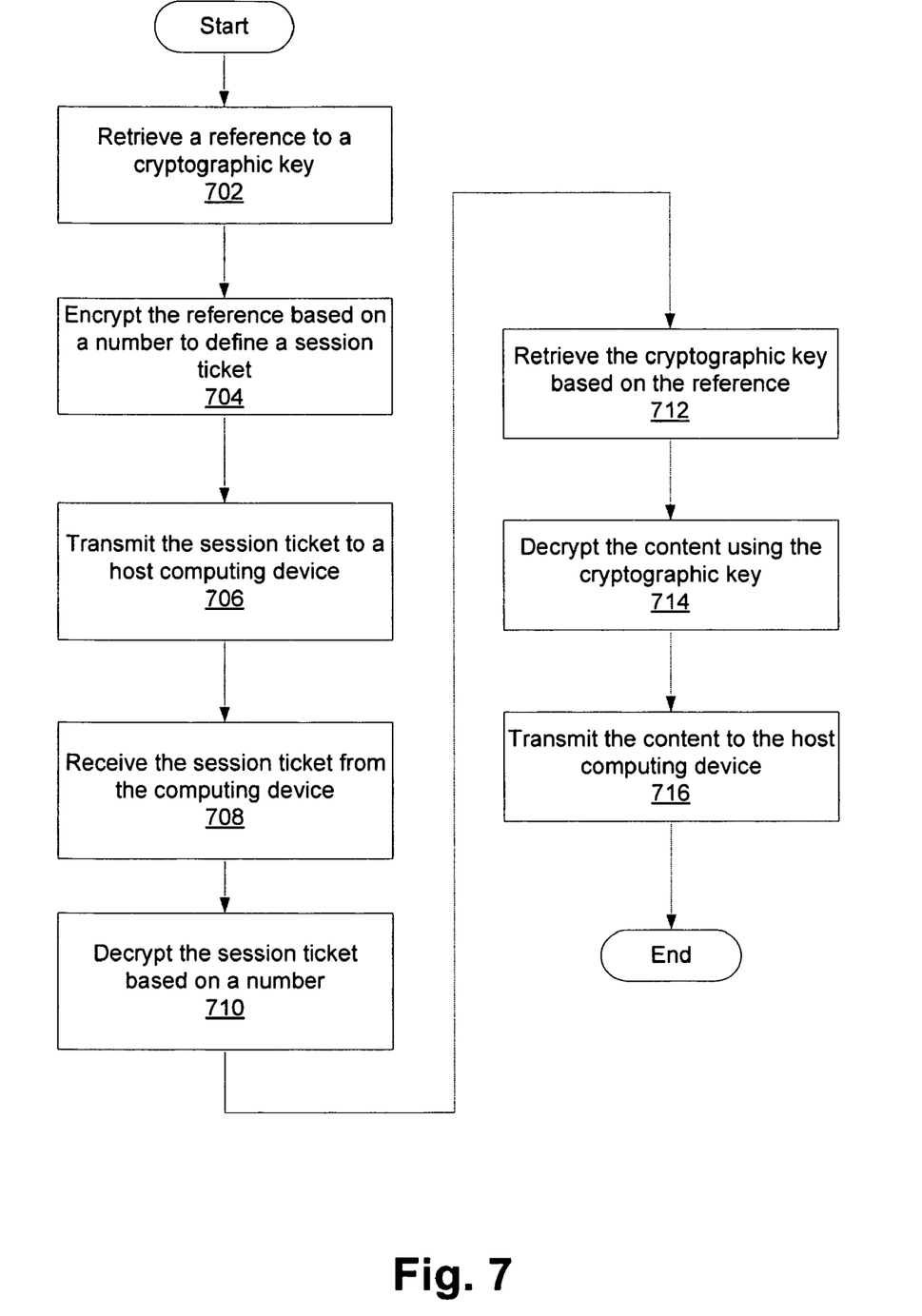
FIG. 7 is a flowchart diagram depicting the access of content from a memory device based on a session ticket, in accordance with an embodiment of the invention.

FIG. 7 is a flowchart diagram depicting the access of content from a memory device based on a session ticket, in accordance with an embodiment of the invention. Starting at 702, a reference to a cryptographic key is retrieved. The reference may be retrieved from a host computing device or a memory device. The content stored in the memory device is encrypted and can be decrypted using the cryptographic key. With the reference to the cryptographic key, the reference to the cryptographic key is encrypted based on a number at 704 to define a session ticket. The number is configured to change at a session and may be randomly generated. The session ticket can then be transmitted to, for example, a host computing device at 706.

When the host computing device accesses content stored on a memory device, the host computing device can transmit the session ticket received to the memory device at 706. The memory device receives the session ticket at 708 and decrypts the session ticket based on a number at 710. If the number matches the number used to generate the session ticket, then the reference to the cryptographic key can be extracted from the decryption operation. However, if the session has changed and a different number is held by the memory device, then the reference to the cryptographic key cannot be extracted from the decryption operation because the numbers do not match.

If the reference to the cryptographic key can be extracted from the session ticket, then the cryptographic key is retrieved based on the reference at 712. The cryptographic key can be retrieved from, for example, a secure store. The content is then decrypted at 714 using the cryptographic key and then transmitted to, for example, the host computing device at 716.

Figure 8:
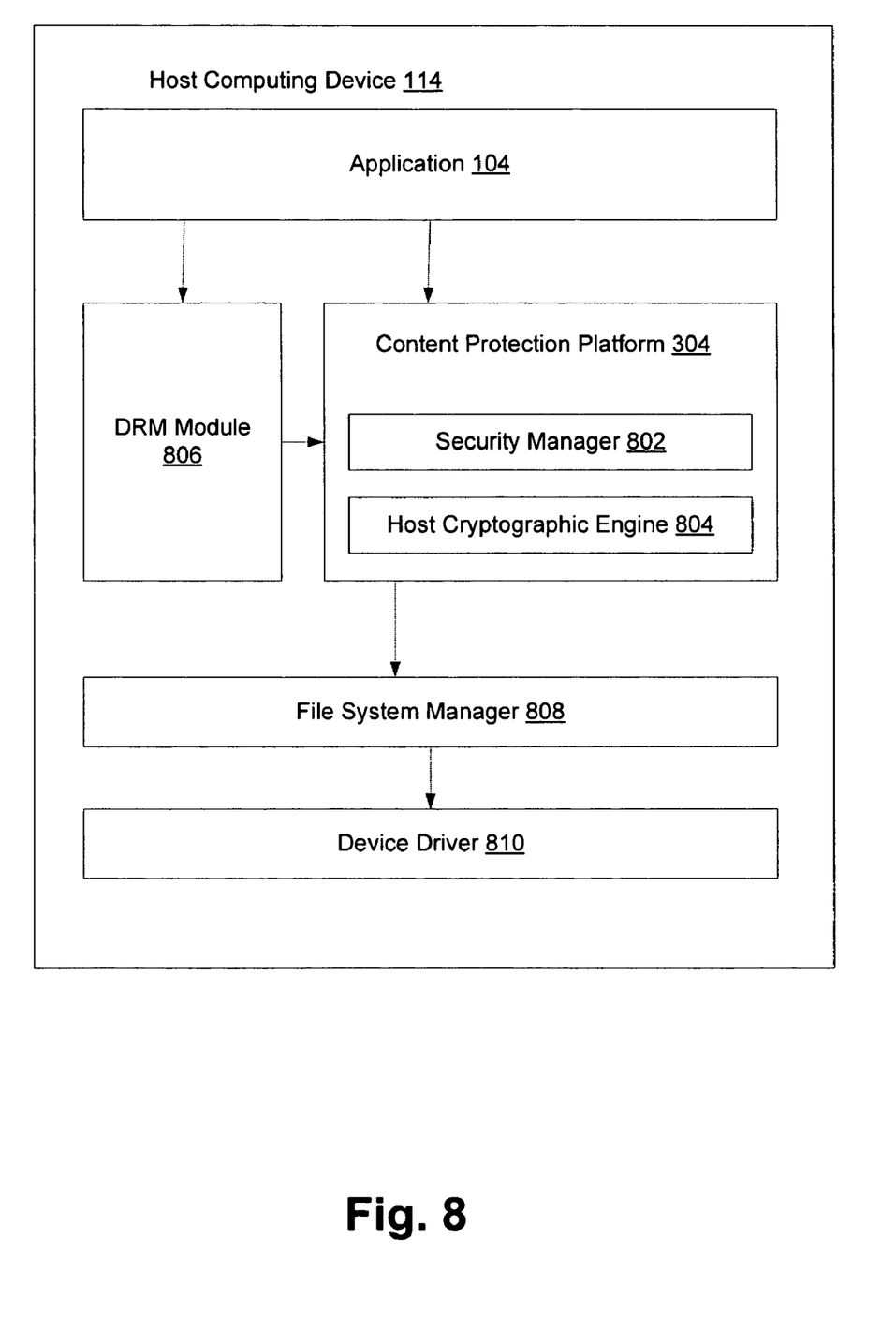
FIG. 8 is a simplified block diagram of program applications that may be hosted on a host computing device for accessing content, in accordance with an embodiment of the invention.

FIG. 8 is a simplified block diagram of program applications that may be hosted on a host computing device for accessing content, in accordance with an embodiment of the invention. Host computing device 114 may host application 104, digital rights management (DRM) module 806, content protection platform 304, file system manager 808, and device driver 810. As discussed above, application 104 may include a variety of program applications, such as multimedia players, video games, and other applications. In communication with application 104 are DRM module 806 and content protection platform 304. DRM module 806 allows host computing device 114 to manage the digital rights of content stored in a memory device or other locations. For example, DRM module 806 may protect content and control their distribution. As discussed above, content protection platform 304 is a technology platform for securing content on a memory device. Content protection platform 304 can include security manager 802 and host cryptographic engine 804. In general, security manager 802 manages the access of content stored in a memory device. Management includes, for example, checking whether the content is protected, generating a reference to a cryptographic key based on parameters associated with a license and the content, generating a session ticket based on a parameter and a variable, generating the variable, and other operations. Host cryptographic engine 804 includes the cryptographic libraries to handle cryptographic operations. Content protection platform 304 and DRM module 806 together provide host computing device 114 (and memory device) with secure storage and content management capabilities. For example, content protection platform 304 and DRM module 806 allow secure storage of content (e.g., music files, movie files, software, and other data) stored in the memory device and enforcement of pre-defined policies for controlling access to the content.

In communication with content protection platform 304 is file system manager 808. In general, file system manager 808 is configured to manage and handle access (e.g., reading, writing, and other access operations) of content stored in a memory device. For example, file system manager 808 can read content from a memory device and transmit the content to content protection platform 304 for processing. Host computing device 114 can interface with a memory device. Host computing device 114 therefore can include device driver 810, which is in communication with file system manager 808, to interface with the memory device. Device driver 810 may, for example, include the lower-level interface functions to communicate with a memory device. An example of a lower-level interface function include input/out functions associated with input and output of data to and from the memory device.

Figure 9:
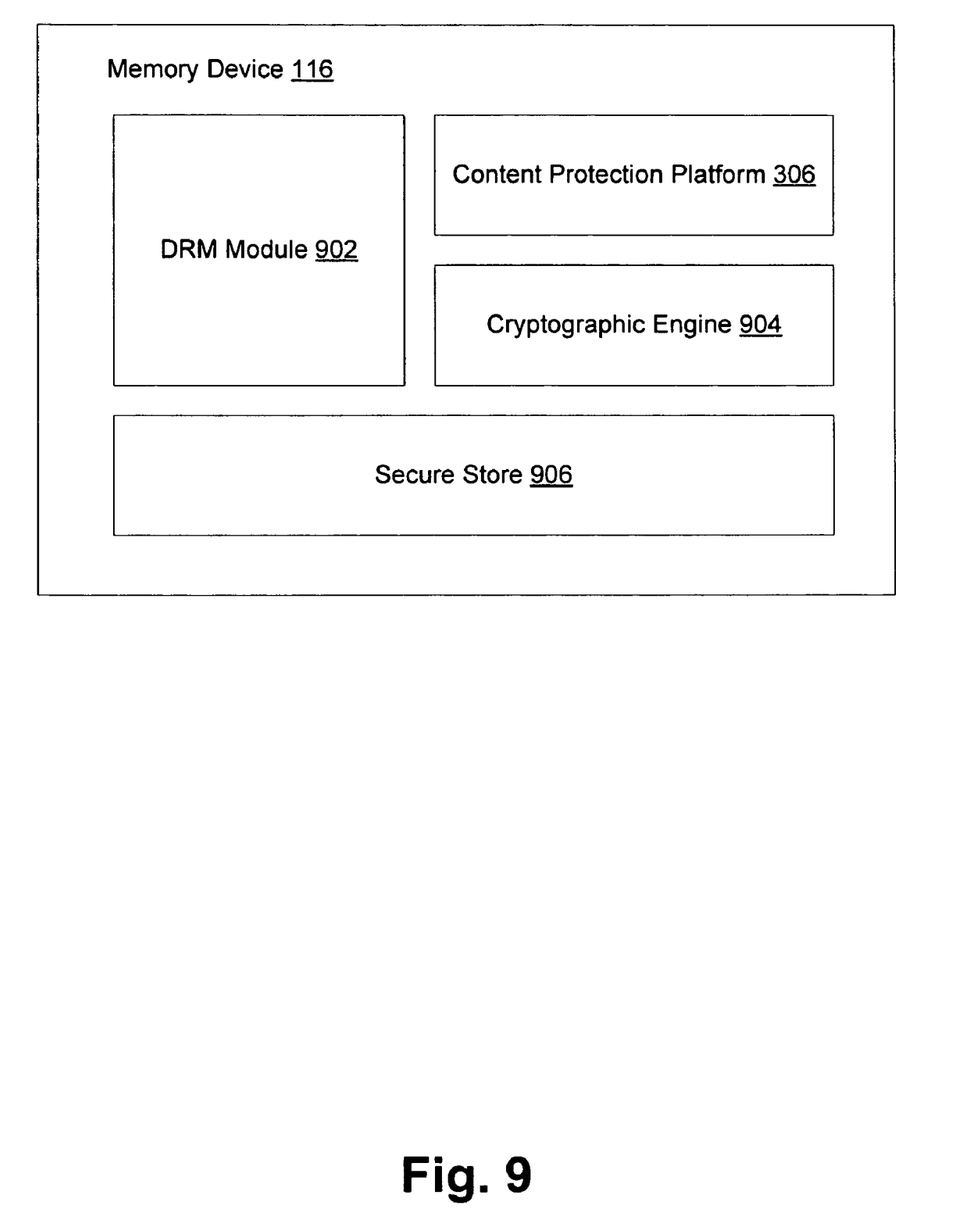
FIG. 9 is a simplified block diagram of program applications that may be included in a memory device, in accordance with an embodiment of the invention.

FIG. 9 is a simplified block diagram of program applications that may be included in a memory device, in accordance with an embodiment of the invention. Memory device 116 may include DRM module 902, content protection platform 306, cryptographic engine 904, and secure store 906. In memory device 116, DRM module 902 allows memory device 116 to manage the digital rights of content stored in the memory device. For example, DRM module 902 may be configured to enforce content rights. Content protection platform 306, as discussed above, is a technology platform for securing content stored on memory device 116. Content protection platform 306 may be configured to generate a reference to a cryptographic key based on parameters associated with a license and the content, to generate a session ticket based on a parameter and a variable, and may be configured for other operations. Cryptographic engine 904 handles cryptographic operations and secure store 906 stores the cryptographic keys.

It should be appreciated that in other embodiments, host computing device 114 of FIG. 8 and memory device 116 of FIG. 9 may include fewer or more program applications apart from those shown in FIGS. 8 and 9. For example, as shown in FIG. 8, file system manager 808 and device driver 810 may be integrated into content protection platform 304. Host computing device 114 of FIG. 8 may therefore include DRM module 806 and content protection platform 304.

Figure 10:
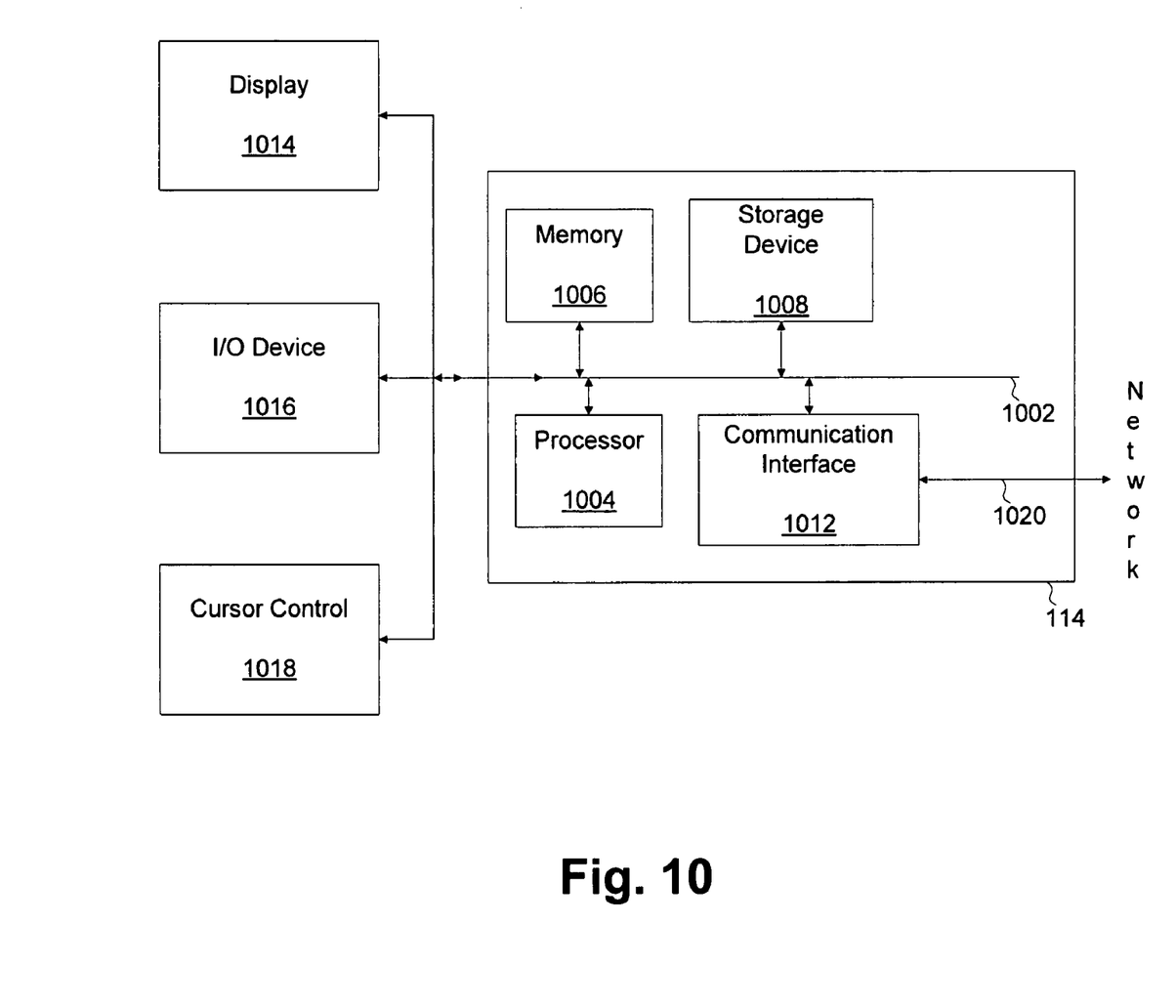
FIG. 10 is a simplified block diagram of a general overview of a host computing device suitable for hosting a content protection platform and other program applications, in accordance with an embodiment of the invention.

FIG. 10 is a simplified block diagram of a general overview of a host computing device suitable for hosting a content protection platform and other program applications, in accordance with an embodiment of the invention. In some embodiments, host computing device 114 may be used to implement computer programs (e.g., content protection platform), logic, applications, methods, processes, or other software to access content. Examples of host computing device 114 include a desktop computer, a server, a portable computing device, a personal digital assistant, a cell phone, a computational engine within an appliance, and other computer systems. As shown in FIG. 10, host computing device 114 includes bus 1002 or other communication mechanism for communicating information, which interconnects subsystems and devices, such as processor 1004, system memory 1006 (e.g., random access memory (RAM)), storage device 1008 (e.g., read only memory (ROM), magnetic disk drives, optical disk drives, and other storage devices), communication interface 1012 (e.g., modem or Ethernet card), display 1014 (e.g., cathode ray tube (CRT) or liquid crystal display (LCD)), input/output device 1016 (e.g., keyboard), and cursor control 1018 (e.g., mouse or trackball).

In some embodiments, host computing device 114 performs specific operations by processor 1004 when executing one or more sequences of one or more program instructions stored in system memory 1006. Such program instructions may be read into system memory 1006 from another computer readable medium, such as storage device 1008. In some embodiments, hard-wired circuitry may be used in place of or in combination with software program instructions to implement embodiments of the invention.

It should be appreciated that the term "computer readable medium" refers to suitable medium that participates in providing program instructions to processor 1004 for execution. Such a medium may take many forms, including but not limited to, non-volatile media, volatile media, and transmission media. Non-volatile media may include, for example, optical or magnetic disks, such as storage device 1008. Volatile media may include dynamic memory, such as system memory 1006. Transmission media includes coaxial cables, copper wire, and fiber optics, including wires that comprise bus 1002. Transmission media can also take the form of acoustic or light waves, such as those generated during radio wave and infrared data communications. Common forms of computer readable media include, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computing device 114. In other embodiments, two or more computer systems, such as host computing device 114, coupled by communication link 1020 (e.g., local area network (LAN), public switched telephone network (PSTN), wireless network, and other communication links) may perform the sequence of program instructions to practice the embodiments in coordination with one another. In addition, computing device 114 may transmit and receive messages, data, and instructions, including program, i.e., application code, through communication link 1020 and communication interface 1012. Received program instructions may be executed by processor 1004 as the program instructions are received, and/or stored in storage device 1008, or other non-volatile storage for later execution.

Figure 11:
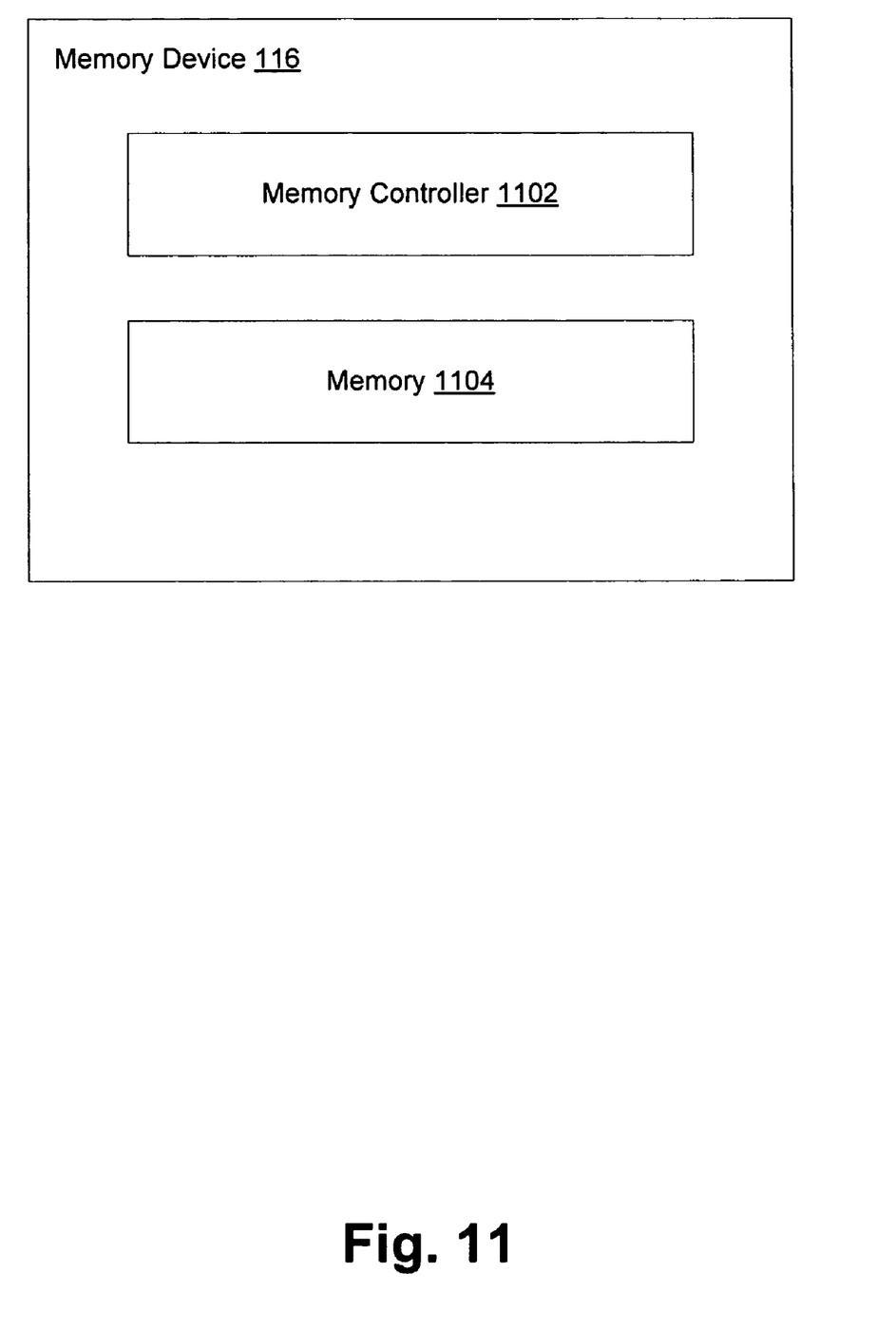
FIG. 11 is a simplified block diagram of a memory device, in accordance with an embodiment of the invention.

FIG. 11 is a simplified block diagram of a memory device, in accordance with an embodiment of the invention. As shown in FIG. 11, memory device 116 includes memory controller 1102 in communication with memory 1104. In general, memory controller 1102 controls the operation of memory 1106. Examples of operations include writing (or programming) data, reading data, erasing data, verifying data, and other operations. Additionally, memory controller 1102 may be configured to generate a parameter based on parameters associated with the license and the content, generate a session ticket based on a parameter and a number, and may be configured for other operations described above.

Memory device 116 can include a variety of non-volatile memory structures and technologies. Examples of memory technologies include flash memories (e.g., NAND, NOR, Single-Level Cell (SLC/BIN), Multi-Level Cell (MLC), Divided bit-line NOR (DINOR), AND, high capacitive coupling ratio (HiCR), asymmetrical contactless transistor (ACT), and other flash memories), erasable programmable read-only memory (EPROM), electrically-erasable programmable read-only memory (EEPROM), read-only memory (ROM), one-time programmable memory (OTP), and other memory technologies. In an embodiment, memory device 116 can be a flash memory card using flash memory. Examples of flash memory cards include a variety of the following trademarked products such as Secure Digital™ (compliant with specifications maintained by the SD Card Association of San Ramon, Calif.), MultiMediaCard™ (compliant with specifications maintained by the MultiMediaCard Association ("MMCA") of Palo Alto, Calif.), MiniSD™ (as manufactured by SanDisk, Inc.), MicroSD™ (as manufactured by SanDisk, Inc.), CompactFlash™ (compliant with specifications maintained by the CompactFlash Association ("CFA") of Palo Alto, Calif.), SmartMedia™ (compliant with specifications maintained by the Solid State Floppy Disk Card ("SSFDC") Forum of Yokohama, Japan), xD-Picture Card™ (compliant with specifications maintained by the xD-Picture Card Licensing Office of Tokyo, Japan), Memory Stick™ (compliant with specifications maintained by the Solid State Floppy Disk Card ("SSFDC") Forum of Yokohama, Japan), TransFlash™ (as manufactured by SanDisk, Inc.), and other flash memory cards. In another embodiment, memory device 116 can be implemented as a non-removable memory device.

The following patent documents contain embodiments that can be used with the embodiments described herein. Each of these patent documents is being filed on the same date as the present application, is assigned to the assignee of the present invention, and is hereby incorporated by reference: "Methods for Linking Content with License," U.S. patent application Ser. No. 11/599,655; "Apparatuses for Linking Content with License," U.S. patent application Ser. No. 11/600,270; "Apparatuses for Accessing Content Based on a Session Ticket," U.S. patent application Ser. No. 11/600,273; "Methods for Binding Content to a Separate Memory Device," U.S. patent application Ser. No. 11/600,262; "Apparatuses for Binding Content to a Separate Memory Device," U.S. patent application Ser. No. 11/600,245; "Method for Allowing Multiple Users to Access Preview Content," U.S. patent application Ser. No. 11/599,994; "System for Allowing Multiple Users to Access Preview Content," U.S. patent application Ser. No. 11/599,995; "Method for Allowing Content Protected by a First DRM System to Be Accessed by a Second DRM System," U.S. patent application Ser. No. 11/600,005; "System for Allowing Content Protected by a First DRM System to Be Accessed by a Second DRM System," U.S. patent application Ser. No. 11/599,991; "Method for Connecting to a Network Location Associated with Content," U.S. patent application Ser. No. 11/600 300; and "System for Connecting to a Network Location Associated with Content," U.S. patent application Ser. No. 11/600,006.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A method for accessing content stored on a memory device, the method comprising:
   performing in a memory device storing content encrypted with a cryptographic key:
   receiving a session ticket and a request to access the content from a host computing device, wherein the session ticket was previously provided to the host computing device and was generated by the memory device by encrypting a parameter associated with the cryptographic key with a variable that has a value associated with a session and that changes value at different sessions;
   attempting to extract the parameter associated with the cryptographic key from the session ticket by decrypting the session ticket with the variable, wherein if the session has not changed, the value of the variable has not changed, and the parameter associated with the cryptographic key is extracted from the session ticket; and
   if the parameter associated with the cryptographic key is extracted from the session ticket:
   obtaining the cryptographic key based on the parameter,
   decrypting the content using the cryptographic key, and
   sending the content to the host computing device.

2. The method of claim 1, wherein the parameter is a reference to the cryptographic key.

3. The method of claim 1, wherein the parameter is a cryptographic nonce, the cryptographic nonce being used to generate the cryptographic key.

4. The method of claim 1, wherein the variable is a number.

5. The method of claim 4, wherein the number is configured to change randomly at different sessions.

6. The method of claim 1, wherein the session spans for a period of time.

7. The method of claim 1, wherein the session expires when the host computing device is restarted.

8. The method of claim 1, wherein the session expires when the memory device is decoupled from the host computing device.

9. A memory device comprising:
   a memory operative to store content encrypted with a cryptographic key; and
   a controller in communication with the memory and operative to:
   receive a session ticket and a request to access the content from a host computing device, wherein the session ticket was previously provided to the host computing device and was generated by the memory device by encrypting a parameter associated with the cryptographic key with a variable that has a value associated with a session and that changes value at different sessions;
   attempt to extract the parameter associated with the cryptographic key from the session ticket by decrypting the session ticket with the variable, wherein if the session has not changed, the value of the variable has not changed, and the parameter associated with the cryptographic key is extracted from the session ticket; and
   if the parameter associated with the cryptographic key is extracted from the session ticket:
   obtain the cryptographic key based on the parameter, decrypt the content using the cryptographic key, and send the content to the host computing device.

10. The memory device of claim 9, wherein the parameter is a reference to the cryptographic key.

11. The memory device of claim 9, wherein the parameter is a cryptographic nonce, the cryptographic nonce being used to generate the cryptographic key.

12. The memory device of claim 9, wherein the variable is a number.

13. The memory device of claim 12, wherein the number is configured to change randomly at different sessions.

14. The memory device of claim 9, wherein the session spans for a period of time.

15. The memory device of claim 9, wherein the session expires when the host computing device is restarted.

16. The memory device of claim 9, wherein the session expires when the memory device is decoupled from the host computing device.

\* \* \* \* \*